United States Patent [19]

Down

[11] 4,176,729
[45] Dec. 4, 1979

[54] ATTACHMENT OF HOVERCRAFT FINGERS

[75] Inventor: Clive L. C. Down, Trowbridge, England

[73] Assignee: Avon Industrial Polymers (Melksham) Limited, England

[21] Appl. No.: 823,692

[22] Filed: Aug. 11, 1977

[30] Foreign Application Priority Data

Aug. 19, 1976 [GB] United Kingdom ............... 34685/76

[51] Int. Cl.² .............................................. B60V 1/16
[52] U.S. Cl. .................................... 180/127; 248/300; 248/317
[58] Field of Search ....................... 180/127, 128, 124; 248/317, 300

[56] References Cited

U.S. PATENT DOCUMENTS

| 666,133 | 1/1901 | Dudley | 248/300 X |
| 2,474,606 | 6/1949 | Nicolet | 248/317 X |

FOREIGN PATENT DOCUMENTS 1261842  1/1972  United Kingdom ..................... 180/127

Primary Examiner—John P. Silverstrim
Attorney, Agent, or Firm—Pennie & Edmonds

[57] ABSTRACT

A connecting element for attaching fingers of a hovercraft skirt to its loop is formed from two identical pieces of elastomer-coated fabric which are bonded together over part of their faces to form a portion to which adjacent side faces of adjacent fingers are secured and which are left unbonded over part of their faces to provide a pair of flaps which are out-turned in mutually opposite directions at right angles to the bonded portion to be secured to the material of the loop.

4 Claims, 7 Drawing Figures

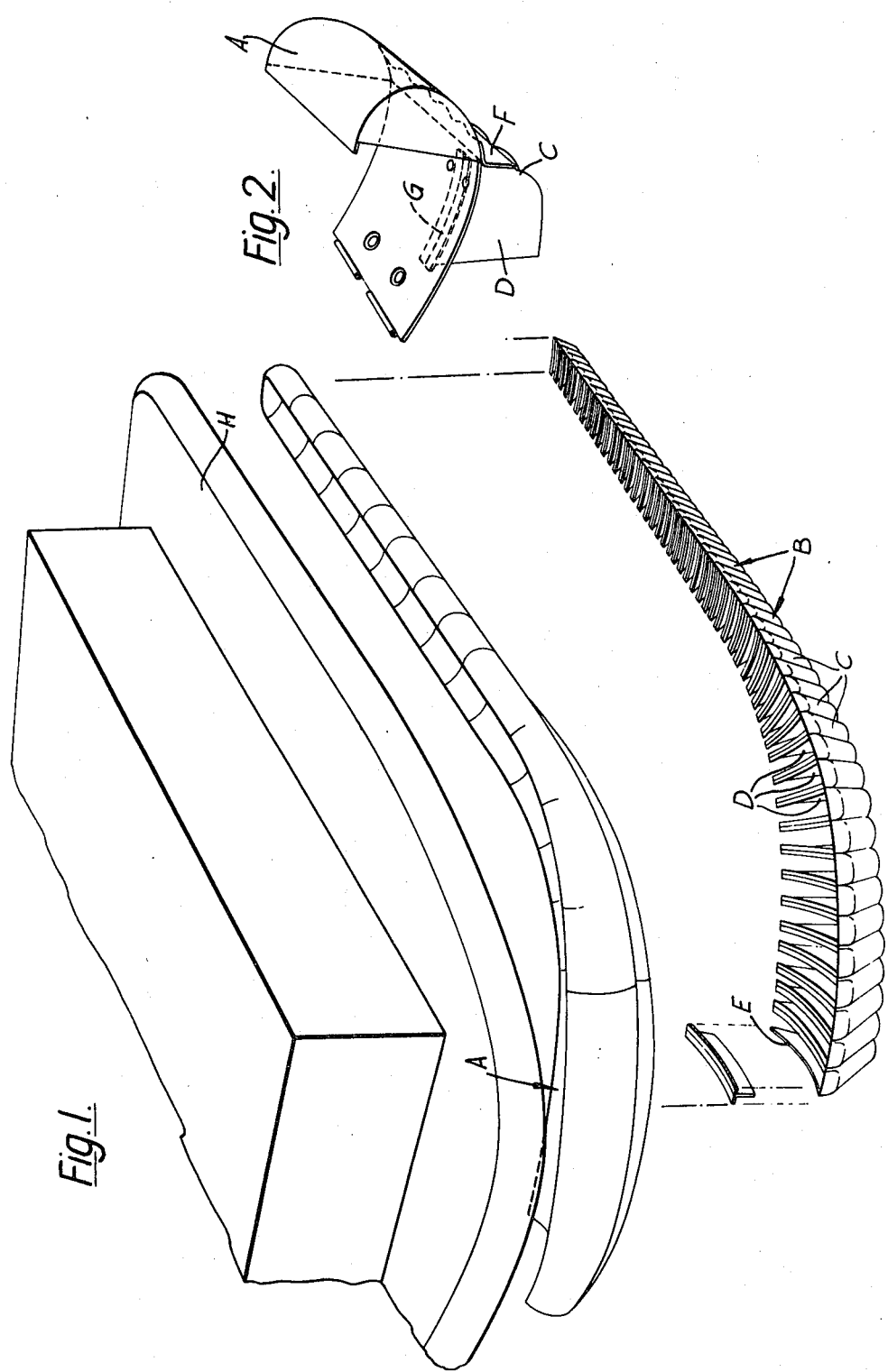

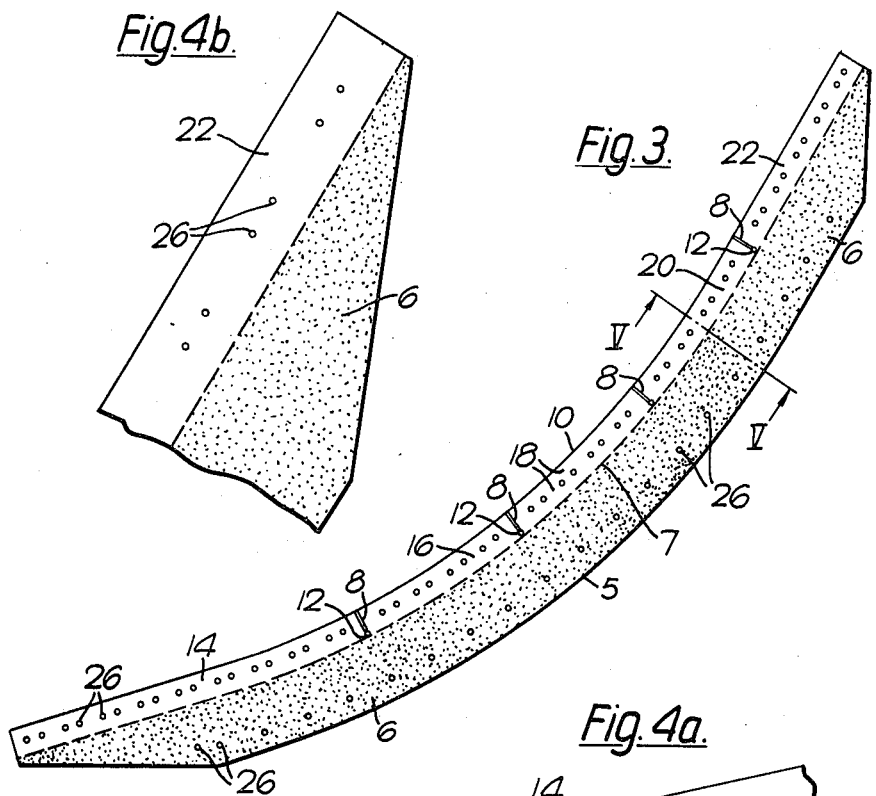
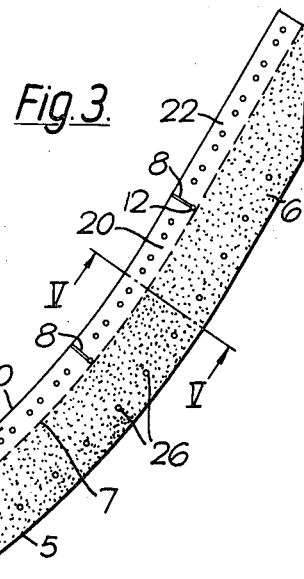
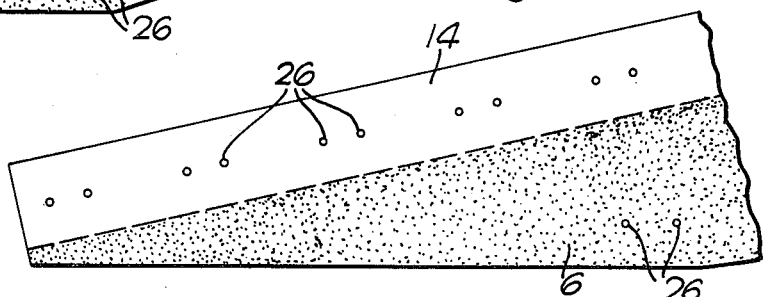
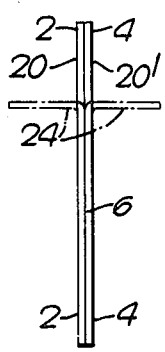
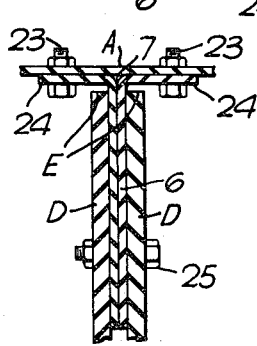

ATTACHMENT OF HOVERCRAFT FINGERS

FIELD OF THE INVENTION

This invention relates to connecting elements in hovercraft skirts and in particular it relates to the elements which attach the fingers to the loop, also known as a bag these forming part of a skirt.

BACKGROUND OF THE INVENTION

Air cushion vehicles (hereinafter called "hovercraft") are in use which have a skirt wherein a so-called loop (also known as a bag) of flexible material extends around the periphery of the rigid structure of the craft and attached to this loop there are a number of separate fingers which depend from the loop. These fingers are frequently attached to the loop by attachment webs. The attachment webs currently used have portions to be secured against a marginal region of a finger depending from the loop, or adjoining marginal regions of adjacent fingers, (which region(s) extend inwardly from the periphery of the hovercraft) and a further portion turned to one side of that planar portion and secured to the underside of the loop, giving a generally L-shaped cross section. Hovercraft have been in service for several years with such attachment webs although the webs have a number of disadvantages. The webs wear at an unacceptably rapid rate and may only last for a few days. When failure begins it tends to propagate rapidly along the full length of the attachment web. The fingers held by the web become detached while the hovercraft is at sea and hanging downwardly constituting a sea anchor. This can, and often does lead to the irretrievable loss of one or more fingers. Several fingers may be lost as the fingers which are hanging downwardly strike against others, and the damage spreads. The fingers are expensive and the task of replacing a substantial number of attachment webs at frequent intervals adds substantially to the cost of maintenance of the hovercraft. Furthermore the edges of the attachment webs are apt to wear through the hovercraft loop.

The attachment webs currently used consist of a single straight strip of flexible material doubled over along its length with a number of notches along one margin of the strip to form portions which can be turned outwardly from the plane of the strip. The unnotched portions are attached to the loop while the notched portions are attached to a vertical part of a finger (or adjoining vertical parts of adjacent fingers). Each notched portion of the strip has to be deformed from a straight to an arcuate condition so that it will follow the contour of the loop. Attachment webs must be handed at each side of the hovercraft so that the portions attached to the loop all lie to the same side, with respect to the direction of travel of the hovercraft, of the portions attached to the fingers.

SUMMARY OF THE INVENTION

According to a first aspect of this invention there is provided a connecting element for the attachment of fingers to a hovercraft loop, the element being formed of flexible sheet material and having a first portion securable against a marginal region of a finger or adjacent fingers and further portions extending from an edge of the said first portion, the said further portions being connected side-by-side to the first portion and being turned (or being capable of being turned) mutually outwardly to each side of the said first portion for securing to the loop of the hovercraft skirt.

Preferably the first portion is an elongate (and preferably flat and arcuate) strip with a plurality of further portions in the form of an end to end sequence of shorter strips, turned (or able to be turned) outwardly to each side. Preferably then the ends of the strips in the sequence turned (or able to be turned) to one side are aligned with those in the sequence turned (or able to be turned) to the other. Such a preferred form of connecting element may be formed from two elongate arcuate pieces of flexible sheet material bonded together face to face over part only of their width, this bonded part constituting an elongate first portion, the remainder of the width of each piece being divided into an end to end sequence of strips by transverse cuts; these strips constitute the further portions. The strips from one piece of sheet material are turned outwardly to one side of the first portion, these from the other piece are turned to the other side.

An alternative possibility is the provision of a plurality of first portions in an end to end sequence with two elongate further portions extending from them and turned (or able to be turned) one to each side.

According to a second aspect of this invention there is provided a hovercraft having at least one finger attached to the loop of the craft by means of a connecting element formed of flexible material and having a first portion secured against a marginal region of a finger or adjacent fingers and further portions extending outwardly to both sides from an upper edge of the said first portion to be secured in the hovercraft skirt.

DESCRIPTION OF THE DRAWINGS

An embodiment of the invention will be described with reference to the accompanying drawings in which:

FIG. 1 is an exploded view showing a general arrangement the port side loop and fingers of a hovercraft, FIG. 2 is a perspective view, on a larger scale, of part of the assembly of loop and fingers, FIG. 3 is a face view of a connecting element;

FIGS. 4a and 4b are enlarged views of the ends of the element of FIG. 2,

FIG. 5 is a section on the line V—V of FIG. 3, and

FIG. 6 is a similar section but showing the connecting element attached to the loop and to two adjacent fingers.

DESCRIPTION OF THE PREFERRED EMBODIMENT

Referring first to FIGS. 1 and 2, the hovercraft H has a loop A of coated fabric extending around its bow and sides, only the port side being shown. A multiplicity of fingers B are attached to the loop A. Each finger is also of elastomer-coated fabric and is a web bent round to offer an outboard wall C and side walls D which extend inwardly from the outboard wall. Side walls of adjacent fingers lie side by side. An apron F depends from the loop to overlie the top margin of the outboard walls C. Air holes in the loops allow air to pass into the fingers and to the air cushion. The upper edges E of the side walls D are curved to conform to the curvature of the undersurface of the loop. The fingers are attached to the loop by connecting elements G which will now be more particularly described.

The connecting elements generally designated G is, as best seen from FIGS. 3 and 5, formed from two elongate arcuate pieces 2,4 of a sheet material. The length of the pieces is substantially the same as that of the top edge E of the fingers to which the connecting element is to be attached. The material is a rubber sheet having a synthetic textile reinforcement, namely a nylon fabric, embedded within it; a material similar to that used for the loops and fingers of the hovercraft. The pieces 2,4 are aligned in face to face relation and bonded together over a part of their width. The bonded area is indicated by stippling in FIGS. 3 and 4, and constitutes an elongate, arcuate first portion 6 of the connecting element. It is delimited by curved edges 5 of the strips 2,4 and by curved edge 7 of the bonded area.

The unbonded area is divided by four cuts 8 perpendicular to the unbonded edges 10 of the pieces 2,4 and terminated by holes 12. These cuts are made through both of the pieces 2,4 and divide the unbonded areas of each into a sequence of five flaps 14,16,18,20,22 end to end, ten flaps in total. These flaps are, in any given cross section, connected side by side to the first portion 6. In use the flaps 14–22 of the piece 2 are turned outwardly to one side of the first portion 6, and the flaps 14'–22' of the piece 4, turned to the other side of the portion 6, towards mutually oppositely out-turned positions 24 which are indicated by broken lines in FIG. 5.

The first portion 6 of the connecting element and the flaps 14–22 which constitute the further portions of that element are provided with fastening means in the form of bolt holes 26.

In use the first portion 6 of a connecting element is bolted by bolts 25, FIG. 6, against the upper marginal parts of the adjacent side walls D of two adjoining fingers B, and the flaps 14–22 of the pieces 2,4 are turned mutually outwardly to each side of the plane containing the first portion and bolted by bolts 23 to the hovercraft's loop. The weight of the fingers on the connecting element gives the element in use a somewhat Y-shaped cross section, rather than the T-shape seen in FIG. 6.

The invention is of course applicable to any hovercraft having loops and fingers.

This embodiment has a number of advantages. It is made from two identical pieces of material and can be formed to any desired curvature to match the loop to which it will be attached. The load deriving from attachment to the loop is symmetrical to each side of the depending first portion 6 and this leads to longer operational life with reduction in damage to the hovercraft loop. Also it is not handed and can therefore be universal in its application around the skirt system.

It is found that these attachment webs have longer operating life before failure begins—typically it may be several times greater—and when failure does begin it propagates much less rapidly. The slower propagation of failure frequently leads to the web continuing to hold the finger or fingers for a sufficient length of time that the incipient failure can be observed, and the web replaced, during maintenance of the hovercraft before the fingers have become detached.

I claim:

1. In a flexible connecting element for connecting at least one finger to a loop in a skirt of a hovercraft and having a first portion for attachment to at least one finger, the improvement comprising a pair of discrete strips of flexible elastomer-coated material forming the element and bonded face-to-face over part of their area to define the first portion, there being in a given cross-section of the element an unbonded part of the area of the strips to define a pair of flaps connected to the first portion, the bonded part being delimited by a curved edge conforming to the curvature of the undersurface of the loop, each said unbonded part being longitudinally subdivided to define a plurality of the said flaps.

2. The improvement as claimed in claim 1 wherein the strips are inextensible, as between longitudinal ends of the strips, in the bonded part.

3. A hovercraft skirt connecting element for connecting at least one finger to a loop of the skirt comprising a first portion adapted to depend substantially perpendicular from said loop of the skirt, attachment means in said first portion adapted to attach an upper marginal portion of said at least one finger face-to-face to said first portion, a further portion having a surface extending face-to-face with the loop and substantially at right angles to the first portion, the further portion comprising at least one pair of flaps joined side-by-side to said first portion, attachment means in each flap of each pair of flaps for attaching the flaps to the loop, the said surface being provided partly by each flap of each pair of flaps, said connecting element comprising two strips of reinforced elastomer material, means bonding said strips together face-to-face over a first part only of their adjacent faces to define the said first portion, a second part of the adjacent faces providing said surface, and said strips being of identical outline and having a pair of generally parallel arcuate edges.

4. A hovercraft skirt as claimed in claim 3 wherein the said first portion is inextensible longitudinally of the element.

* * * * *